Nov. 22, 1938.　　　J. B. STRAUSS　　　2,137,548
LIGHT MEASURING DEVICE
Filed March 15, 1937　　　2 Sheets-Sheet 1
FIG-1-
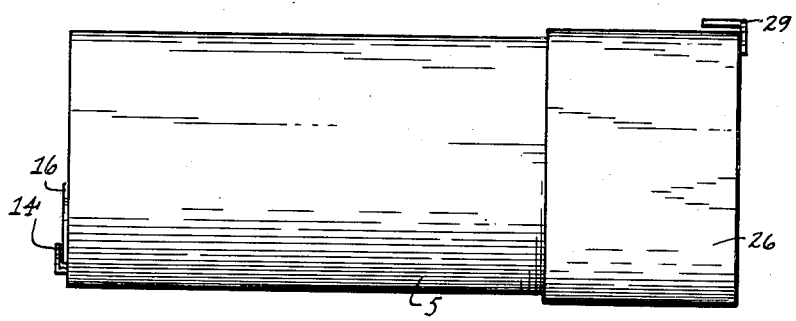
FIG-2-
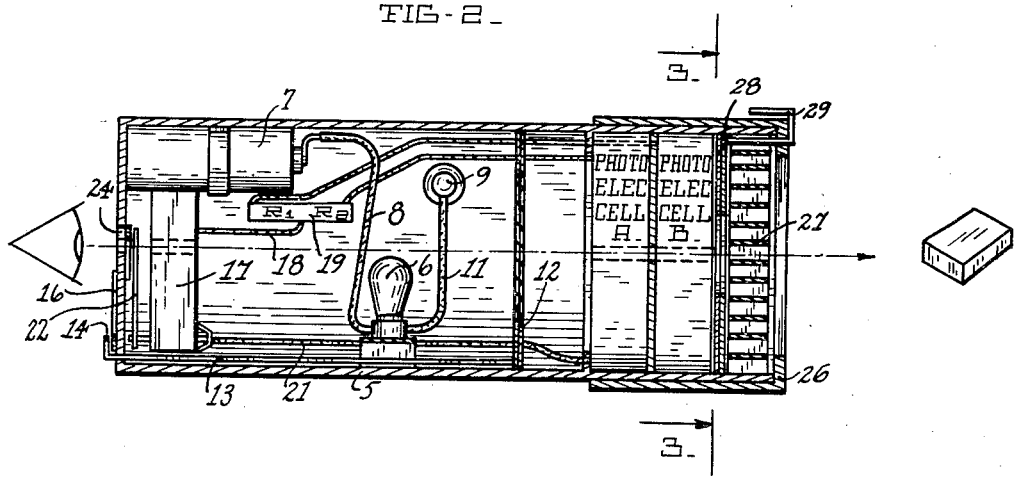
INVENTOR.
JOSEPH B. STRAUSS.
BY
ATTORNEY.

Nov. 22, 1938.   J. B. STRAUSS   2,137,548
LIGHT MEASURING DEVICE
Filed March 15, 1937   2 Sheets-Sheet 2
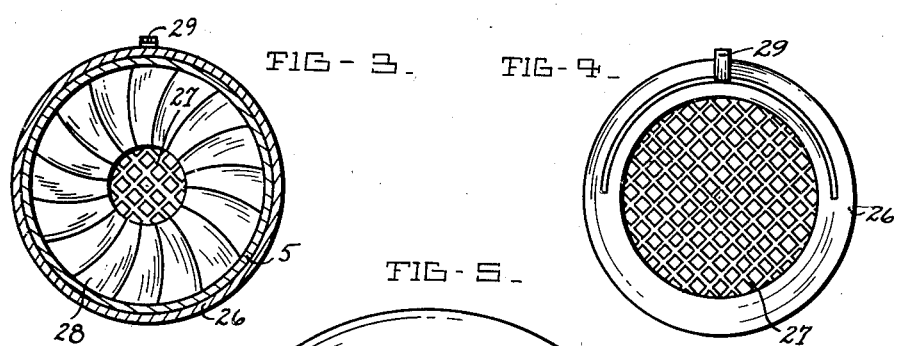
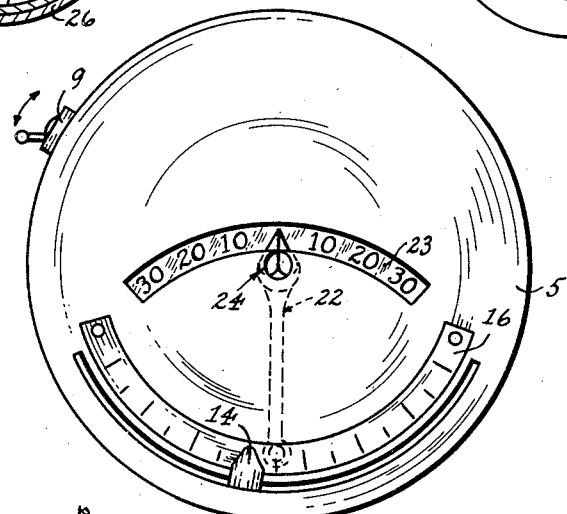
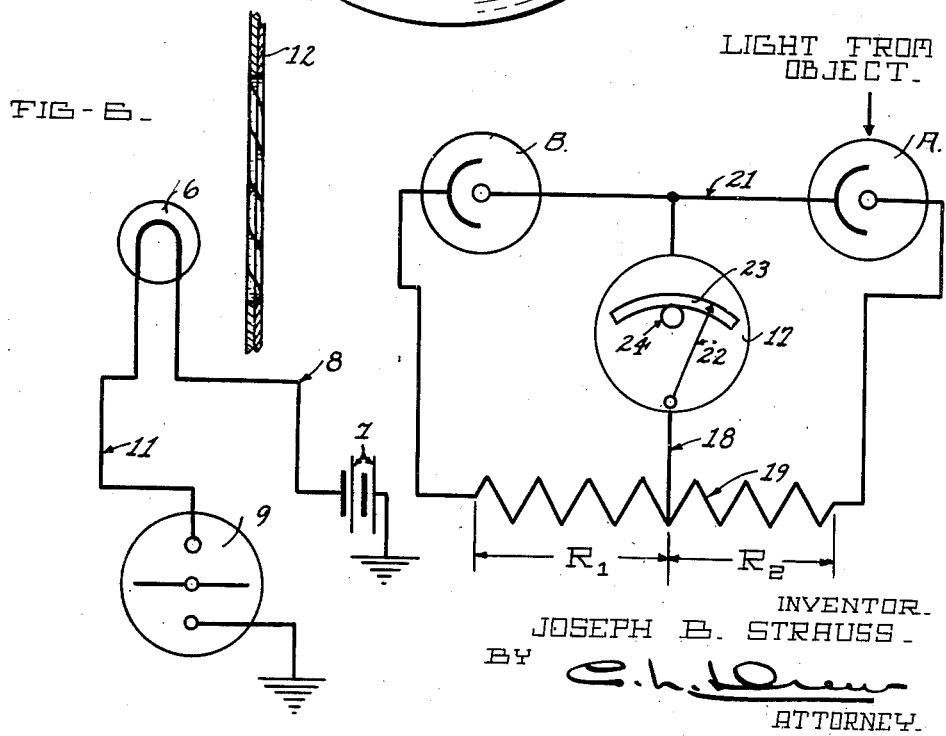
INVENTOR.
JOSEPH B. STRAUSS
BY
ATTORNEY.

Patented Nov. 22, 1938

2,137,548

UNITED STATES PATENT OFFICE 2,137,548

LIGHT MEASURING DEVICE

Joseph B. Strauss, San Francisco, Calif.

Application March 15, 1937, Serial No. 130,902

2 Claims. (Cl. 88—23)

This invention relates to improvements in light measuring devices.

The principal object of this invention is to provide accurate means for determining the actinic value of light reflected from an object and to convert the measurement thereof into readings, whereby a photographic device may be actuated from these readings.

A further object is to produce a device of this character which is compact, and one wherein direct vision through the device scans definite areas, in counter-distinction to meters of this character which scan wide areas.

A further object is to provide means for eliminating oblique rays, thereby controlling the light reaching the photo-electric cell.

Other objects and advantages will be apparent during the course of the following description.

In the accompanying drawings forming a part of this specification and in which like numerals are employed to designate like parts throughout the same, Fig. 1 is a side elevation of my device;

Fig. 2 is a vertical cross section of my device;

Fig. 3 is a cross sectional view taken on the line 3—3 of Fig. 2;

Fig. 4 is an end elevation of Fig. 2, looking from the right of the drawing;

Fig. 5 is an enlarged end elevation of Fig. 2, looking from the left of the drawing; and Fig. 6 is a diagrammatic view, showing the wiring arrangement.

In photography it is important to know the amount of light being reflected by an object to be photographed in order to adjust the camera to the proper diaphragm opening and shutter speed. There are a number of devices now on the market for determining these values, some of which operate by using a photo-electric cell, wherein the rays of illumination contacting a photo-electric cell energize the same and cause a meter to indicate the light value. These light gauges are far from accurate for the reason that various characteristics in the cells and in the meters vary to quite an appreciable amount. It is a well-known fact that a balanced circuit is the most accurate method of determining values. Therefore, I have employed such a system.

In the accompanying drawings wherein for the purpose of illustration is shown a preferred embodiment of my invention, the numeral 5 designates a casing, in one end of which is located a photo-electric cell B and a photo-electric cell A, the same being placed back to back so that they will be energized by light coming from opposite directions. The cell A is energized by rays of light coming from a bulb 6, positioned within the casing 5 and connected to a battery 7 through a wire 8, the opposite side of the battery being grounded to the casing 5, as is also the switch 9, which switch is in turn connected to the bulb 6 through the wire 11. A diaphragm 12, positioned within the casing, controls the amount of light reaching the photo-electric cell A from the bulb 6 and is controlled by a lever 13 extending through the end of the casing and having its upturned end 14 movable over a scale 16, which scale is marked in $f$ values. A meter 17 is positioned within the casing and has one side thereof connected by a wire 18 to the center of a resistance element 19 and has its opposite side connected by a wire 21 to the photo-electric cells A and B. The opposite side of the photo-electric cell B is connected to one end of the resistor 19, which part of the resistor is marked $R_1$ in Fig. 6, and the cell A has its opposite side connected to the resistor 19, which part of the resistor is marked $R_2$ in this figure. The meter 17 carries a pointer 22 which moves over a scale 23. A peep hole 24 is formed in the end of the casing and is in alignment with similar peep holes in the meter 17 and cells A and B so that a line of vision may pass through the device, as indicated by the broken line in Fig. 2.

In order to control the direction of light to the cell B, I employ a telescopic member 26 having a grid 27 and a diaphragm 28, which diaphragm is actuated by a lever 29, the purpose of which will be later seen.

As a result of this construction, when the opposite sides of the circuits in which the cells A and B are located are balanced by light of equal intensity falling on them, the meter will read zero. I have provided means for controlling the light from the bulb 6 through the use of the diaphragm 12. Therefore, when the diaphragm 12 is so adjusted that the meter reads zero, the light falling on the cell A and the cell B will be equal, and the reading on the scale will be the $f$ value or shutter opening correct for the light reflected from the object to be photographed at that time.

In using my device the same is held to the eye, as indicated in Fig. 2, and the object sighted; then the lever 13 is moved, which will move the diaphragm 12 until the balanced condition exists. At this time the pointer 22 will be at zero and will cover the peep hole 24 so that the operator can no longer see the object nor the light within the meter. Thus he will know that the balanced condition has occurred and can immediately read the result upon the scale.

The diaphragm 28 and the grid 27 have the effect of controlling the area being observed, as by closing down the diaphragm 28, the smaller areas may be measured without the error incurred by extraneous light; and the grid 27 has the effect of preventing oblique rays from reaching the cell B. Therefore, a very close inspection of an area may be made.

When the telescopic member 26 is removed, then the device becomes non-directional and may be employed for measuring general illumination.

The scale 23 may be calibrated in foot candle power and may be actuated by the photo-electric cell B only, at which time the switch 9 will be in such a position that the light 6 will not be used.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. A light measuring device comprising a cylindrical casing closed at one end by a plate having a central viewing aperture, a pair of disc like photo-electric cells in the other end of said casing in back to back relation to receive light respectively from within and without said casing, a source of light within said casing to illuminate said inwardly directed cell, a diaphragm having a variable aperture positioned between said last-mentioned cell and said light source, means for indicating the degree of opening of said aperture, each of said cells having a peephole aligned with said viewing aperture, and an electric meter electrically connected to each of said cells and having a movable pointer capable of moving across the line of sight through said casing when said cells are activated to cause said meter to read zero.

2. A light measuring device comprising a cylindrical casing closed at one end by a plate having a central viewing aperture, a pair of disc like photo-electric cells in the other end of said casing in back to back relation to receive light respectively from within and without said casing, a source of light within said casing to illuminate said inwardly directed cell, a diaphragm having a variable aperture positioned between said last-mentioned cell and said light source, means for indicating the degree of opening of said aperture, each of said cells having a peephole aligned with said viewing aperture, an electric meter electrically connected to each of said cells and having a movable pointer capable of moving across the line of sight through said casing when said cells are activated to cause said meter to read zero, and a second variable apertured diaphragm positioned in said casing and controlling the light source from without said casing, whereby the light may be variably controlled.

JOSEPH B. STRAUSS.